May 2, 1950        F. WINANS        2,506,401
FILM PROCESSING RACK

Filed Nov. 6, 1944        2 Sheets-Sheet 1

INVENTOR,
Fonville Winans.
BY Roy E. Hamilton,
Attorney.

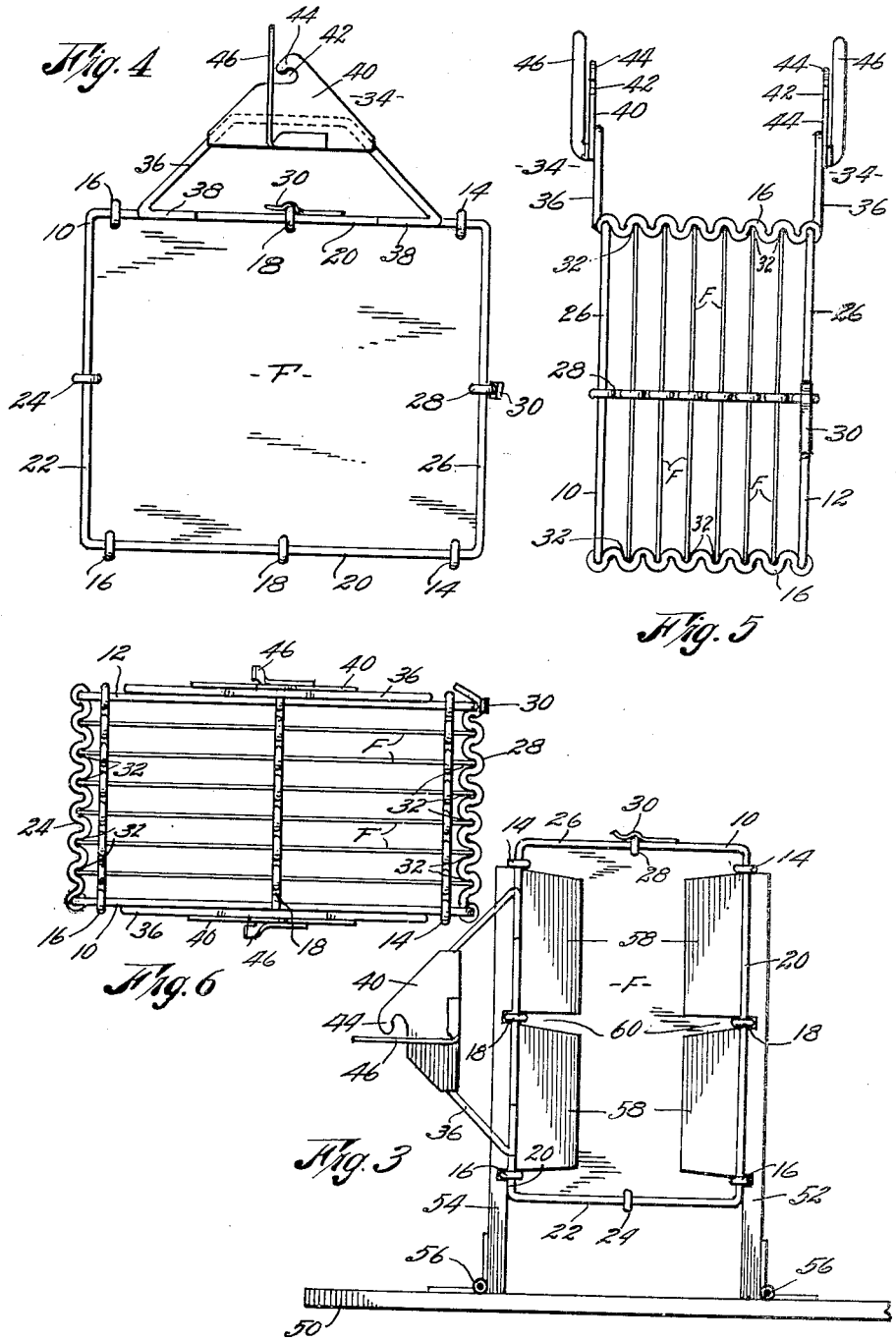

Patented May 2, 1950

2,506,401

UNITED STATES PATENT OFFICE 2,506,401

FILM PROCESSING RACK

Fonville Winans, Baton Rouge, La.

Application November 6, 1944, Serial No. 562,162

6 Claims. (Cl. 95—100)

This invention relates to improvements in racks and has particular reference to a film processing rack.

The principal object of the present invention is the provision of a rack suitable for receiving and retaining films in spaced apart relation for processing.

Another object of this invention is the provision of a film processing rack having loading blocks whereby the film may be readily inserted in proper position in the rack.

A further object is the provision of a rack having a hinged corrugated wire closure member adapted to be positioned to secure the films against movement in the rack.

A still further object of this invention is the provision of a rack suitable for holding a series of films in spaced apart parallel relation whereby all the surfaces of the films are exposed to the developing and fixing liquids.

Other objects are simplicity and economy of construction, ease and efficiency of operation and adaptability for use in securing planar sheets in predetermined spaced apart relation for processing.

With these objects in view as well as other objects which will appear during the course of the specification, reference will now be had to the drawings, wherein:

Fig. 3 is a side elevation of the device shown in Fig. 1.

Fig. 4 is an enlarged side elevational view of the rack charged with films.

Fig. 5 is an end elevational view of the rack shown in Fig. 4, and

Fig. 6 is a plan view of the rack shown in Fig. 4.

Figure 1:
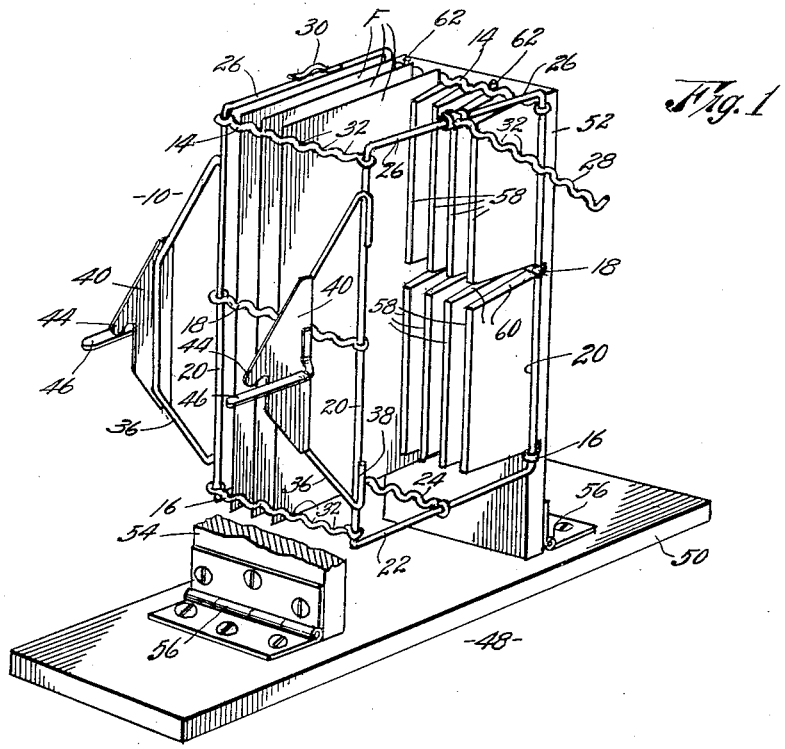
Figure 1 is a perspective view of a film receiving rack positioned in operative relation with a filling block with parts broken away, embodying this invention.
Figure 2:
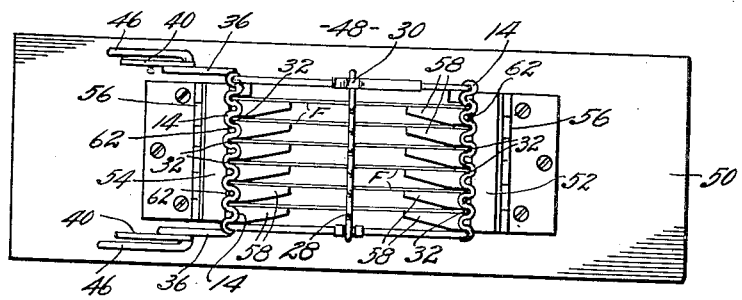
Fig. 2 is a plan view of the rack and filling block shown in Fig. 1.

Throughout the several views like reference characters refer to similar parts and the numerals 10 and 12 designate triangular members or frames, each made of a single strand of wire or of any other material suitable for producing a similar open frame-like element. These frame members are of like form and size and are secured together in spaced apart parallel relation by means of a series of corrugated wire strands.

Referring to Fig. 1, it will be noted that corrugated wire strands 14 join together the upper extremities of the frames 10 and 12, strands 16 join together the lower portion of the frame and the wire strands 18 join together the central portion of the frames 10 and 12. All of these wire strands are securely attached to the elongated sides 20 of the frames 10 and 12. The lower cross members 22 of frames 10 and 12 are joined together by the cross corrugated strand 24 and the opposite upper cross members 26 of frames 10 and 12 are joined together by a hinged corrugated strand of wire 28 which serves as a closure and is releasably secured by the spring latch member 30 to one of the upper cross members 26. These wire strands are all corrugated in like manner and are so positioned relative to the film as shown in Fig. 1, that the film will enter corresponding recess 32 in each of said corrugated strands when the film is in a planar form. In other words, corresponding corrugations of all the corrugated strands lie within a common plane.

It will be noted that the long side of the film F is supported by three of the corrugated wire strands at both sides of the rack. However, with larger films, it may be found necessary to use a larger number of these supporting strands to properly hold the film in position. While the rack is charged from one end as indicated in the drawings, yet it is supported vertically from a pair of the elongated side strands 20 during the developing and fixing operations.

Supporting means 34 comprises a substantially triangular member 36 welded or otherwise secured to elongated member 20 at 38 provided at its outer extremity with a sheet metal plate 40 notched at its outer extremity at 42 to present a hook 44 suitable for engaging a rod carried by the container of the bath in which the films are to be processed. A spring detent 46 securely attached to plate 40 serves to prevent accidental displacement of the rack from its supporting member. Like supporting means are provided at each side of the rack so that the film will be maintained in a substantially vertical position in the bath.

It will be seen that the members 20 at each side of the device, together with the connecting members 14, 18 and 16, could be considered as side portions of the entire open-work frame or structure. The rectangular open frames having side portions 20 and top and bottom portions 22 and 26 are also connected by the members 14, 18 and 16, as well as bottom member 24 and top member 28 when the latter is in the film-holding position.

To facilitate rapid filling or charging of the rack with films, it has been found convenient to provide a filling block 48 comprising a base 50 having slotted members 52 and 54, hinged at 56 thereto. The tongues 58 of members 52 and 54 are adapted to project into the rack and are so spaced apart that the slots formed between the tongues will register respectively with the corrugations of said wire strands so as to provide guideways to direct the films to the proper recess therebelow. It will be noted that the tongues 58 are notched adjacent their central portion at 60 to receive the wire strands 18. Each of the slotted members 52 and 54 are provided with stop pins 62 which serve to limit the insertion of the tongues 58 into the rack. When positioning the rack on the filler block, one of the slotted members is first fitted into the rack and then the other slotted member is hinged upwardly to the proper position. With the closure corrugated member 28 moved to the position shown in Fig. 1, the films may be positioned to fill the rack. Now the closure 28 may be moved in position beneath latch 39 and the rack removed from the filling block. It is now ready for the processing operations which are performed in the usual manner. The operator can easily manipulate the rack without contacting the films and the films all remain in the same position in the rack during the various steps of developing, fixing, etc. because each edge thereof is mounted in at least one recess in the corrugated strands.

While but six films can be processed in the rack shown, yet it is quite apparent that the rack may be elongated to hold 24 or any other desired number of films for processing at the same time without departing from the general structure shown and described.

Having thus described the invention, what I claim as new and desire to be secured by Letters Patent is:

1. A rack for supporting films in spaced apart parallel relation comprising a rectangular box shaped member provided at four of its sides with similarly corrugated parallel wires whereby to engage and secure in spaced apart relation a series of rectangular sheets, a base member, and a pair of slotted members hinged to said base and having spaced apart tongues adapted to be positioned in said rack with the slots therebetween in register with the corrugations of said corrugated wires whereby to provide guides between adjacent corrugated wires for the insertion of the film.

2. A rack for supporting films in spaced apart parallel relation comprising a substantially rectangular box shaped open member provided at four of its sides with similarly corrugated parallel wires having their corrugations relatively positioned to engage the four sides of each of a series of rectangular sheets to hold the sheets in spaced apart parallel relation, a base member, and a pair of slotted members hinged to said base and having spaced apart tongues adapted to be positioned in said rack with the slots therebetween registering respectively with the corrugations of said wire members whereby to provide guide channels between adjacent corrugated wires for guiding the films to the proper position in the rack.

3. A rack for supporting films in spaced apart parallel relation comprising a substantially rectangular box shaped open member provided at four of its sides with similarly corrugated parallel wires having their corrugations relatively positioned to engage the four sides of each of a series of rectangular sheets to hold the sheets in spaced apart parallel relation, a base member, and a pair of members hinged to said base and having spaced apart tongues to present slots therebetween adapted to be positioned into the opposite sides respectively of said rack with the slots thereof registering respectively with the corrugations of said wire members whereby to provide guide channels between adjacent corrugated wires for guiding the film to the proper position in the rack.

4. A device for holding a plurality of films for processing having in combination, an openwork frame having opposite side portions each comprising vertically spaced members having a plurality of recesses formed therein adapted to receive the side edge portions of films, said frame having a bottom means for supporting films, a base, swingingly mounted guiding members on said base each having vertically spaced sets of inwardly projecting plate-like members, said members tapering inwardly, one of said first mentioned spaced vertical members being disposed between said sets, and said other vertically spaced members being disposable above and below said sets respectively whereby films can be placed between said projections, the space between said projections being aligned with the recesses in said vertically spaced members, said guiding members being swingable away from said device.

5. A holding and guiding device for an open work film holding rack comprised of wires and having film receiving recesses formed therein, comprising a base member, a pair of members hinged to said base in spaced relation and adapted to be swung down into substantially horizontal position away from each other and to be swung to substantially vertical position, each of said members having projecting inwardly therefrom and longitudinally thereof a plurality of spaced plate-like members tapering toward their inner ends, said plate-like members being adapted to project into said rack with the spaces therebetween in registering relation with said film receiving recesses, said plate-like members being notched where necessary to accommodate the wires comprising said rack.

6. A device for holding a plurality of films for processing having in combination, an openwork structure comprising spaced open frames formed of small rods or wires and having top, bottom and side portions, a plurality of vertically spaced members extending between and connecting said side portions at both sides of said frames, said members having a plurality of recesses therein arranged to receive the side edge portions of films, a member extending between the bottom portions of said frames intermediate the ends thereof also having a plurality of recesses therein transversely aligned with said first mentioned recesses, a film-holding and spacing rod movably connected at one end to the top portion of one of said frames, and means on the top portion of the other of said frames for removably holding said last mentioned rod in film-holding and spacing position, and a planar support structure extending outwardly from corresponding sides of each of said frames, said support structures including plates having transversely aligned recesses formed therein to receive a supporting rod, and detents for closing said recesses to secure said support structures on said rod.

FONVILLE WINANS.

REFERENCES CITED

The following references are of record in the file of this patent:

UNITED STATES PATENTS

| Number | Name | Date |
|---|---|---|
| 404,605 | Gullen | June 4, 1889 |
| 681,658 | Potter | Aug. 27, 1901 |
| 711,978 | Kennedy | Oct. 28, 1902 |
| 1,027,626 | Pelton | May 28, 1912 |
| 1,782,068 | Hazell | Nov. 18, 1930 |
| 1,909,566 | Bender et al. | May 16, 1933 |
| 2,082,876 | Davis | June 8, 1937 |
| 2,120,706 | Lynch | June 14, 1938 |
| 2,122,723 | Pinkham | July 5, 1938 |
| 2,288,325 | Rodier | June 30, 1942 |

FOREIGN PATENTS

| Number | Country | Date |
|---|---|---|
| 4,202 | Great Britain | 1887 |
| 16,074 | Great Britain | 1892 |
| 22,578 | Great Britain | 1901 |
| 508,132 | Germany | Sept. 23, 1930 |